United States Patent
Machac, Jr. et al.

(10) Patent No.: US 6,420,327 B1
(45) Date of Patent: Jul. 16, 2002

(54) CARBONATE-BASED COATING REMOVERS

(75) Inventors: James R. Machac, Jr.; Edward T. Marquis; Susan A. Woodrum; Howard P. Klein, all of Austin, TX (US)

(73) Assignee: Huntsman Petrochemical Corporation, Austin, TX (US)

( * ) Notice: Subject to any disclaimer, the term of this patent is extended or adjusted under 35 U.S.C. 154(b) by 156 days.

(21) Appl. No.: 09/634,374

(22) Filed: Aug. 9, 2000

(51) Int. Cl.$^7$ .............................. C11D 3/39; C11D 3/43
(52) U.S. Cl. ...................... 510/201; 510/202; 510/176; 510/206; 510/405; 510/432; 510/367; 134/38
(58) Field of Search .......................................... 510/201

(56) References Cited

U.S. PATENT DOCUMENTS

| | | | |
|---|---|---|---|
| 3,355,385 A | 11/1967 | Mackley et al. ............... | 134/2 |
| 4,680,133 A | 7/1987 | Ward .......................... | 252/153 |
| 5,215,675 A | 6/1993 | Wilkens et al. .............. | 252/100 |
| 5,454,985 A | 10/1995 | Harbin ....................... | 510/206 |
| 5,456,853 A | 10/1995 | Myers ........................ | 252/170 |
| 5,698,507 A | 12/1997 | Gorlin et al. ............... | 510/223 |
| 5,721,204 A | 2/1998 | Maxwell et al. ............. | 510/206 |
| 5,817,612 A | 10/1998 | Distaso ....................... | 510/203 |
| 5,821,209 A | 10/1998 | Distaso et al. .............. | 510/207 |
| 5,830,836 A | 11/1998 | Smith et al. ................. | 510/212 |
| 6,040,284 A | 3/2000 | Marquis et al. .............. | 510/201 |
| 6,162,776 A * | 12/2000 | Marquis et al. .............. | 510/201 |
| 6,169,061 B1 * | 1/2001 | Machac et al. ............... | 510/201 |
| 6,239,090 B1 * | 5/2001 | Marquis et al. .............. | 510/201 |

FOREIGN PATENT DOCUMENTS

| | | |
|---|---|---|
| EP | 497 130 | 8/1992 |
| WO | WO97/29158 | 8/1997 |
| WO | PCT/US98/10576 | 5/1998 |

OTHER PUBLICATIONS

Huntsman Corporation—Technical Bulletin: Jeffsol Propylene Carbonate; 1 page (form1025–1099); 1985.

Huntsman Corporation—Technical bulletin; Jeffsol Alkylene Carbonates Paint Remover Formulations; 1 page (form 1091–1099); 1995.

Huntsman Corporation—Technical Bulletin: Jeffstrip FST Activated Alkylene Carbonate Solution; 1 page (form 1038–1099); and 1999.

Huntsman Corporation—Marketing Bulletin: Jeffstrip FST; 1 page (form 1037–1099, 1999.

* cited by examiner

*Primary Examiner*—Yogendra N. Gupta
*Assistant Examiner*—John M. Petruncio
(74) *Attorney, Agent, or Firm*—Russell R. Stolle; Ron D. Brown; Nicole Peffer

(57) ABSTRACT

Coating remover compositions comprising an alkylene carbonate, hydrogen peroxide, water, a first alcohol, a second alcohol, and, optionally, pine oil that exhibit low toxicity. Further, a method of removing a coating from a surface. The method involves contacting a composition comprising an alkylene carbonate, hydrogen peroxide, water, a first alcohol, a second alcohol, and optionally, pine oil to a coated surface, and allowing the composition to contact the coated surface for a period of time, and under conditions effective to cause blistering of the coating. The compositions and method of the present invention are particularly suited for use with varnishes.

29 Claims, No Drawings

CARBONATE-BASED COATING REMOVERS

TECHNICAL FIELD

This invention relates to coating removers, and, more particularly, to carbonate-based coating removers and methods of using them.

BACKGROUND OF THE INVENTION

Numerous compositions have been developed to remove various coatings, such as paints or varnishes, from a variety of surfaces, including woods and metals. Conventional coating removers typically contain toxic components, such as methylene chloride or phenol, which makes the use of these removers undesirable. However, in recent years, less toxic coating removers have been developed in an effort to replace the more toxic removers. Unfortunately, many of these less toxic coating removers are not nearly as effective as the methylene chloride-based removers. Due to the deficiencies in many of these less toxic coating removers, a need exists for less toxic coating removers that rival the effectiveness of the methylene chloride-based coating removers.

SUMMARY OF THE INVENTION

Accordingly, the present invention is directed toward highly effective coating removers that exhibit low toxicity. In one embodiment, the present invention provides for compositions useful as a coating remover. These compositions comprise an alkylene carbonate, hydrogen peroxide, water, a first alcohol, a second alcohol, and, optionally, pine oil.

In another embodiment, the present invention provides for a method of removing a coating from a surface. The method involves applying a composition comprising an alkylene carbonate, hydrogen peroxide, water, a first alcohol, a second alcohol, and, optionally, pine oil to a coated surface, and allowing the composition to stand on the coated surface for a period of time, and under conditions effective to cause blistering of the coating.

DETAILED DESCRIPTION OF THE PREFERRED EMBODIMENT

In one embodiment, the present invention provides compositions useful as a coating remover. These compositions comprise an alkylene carbonate, hydrogen peroxide, water, a first alcohol, a second alcohol, and, optionally, pine oil.

The compositions of the present invention may comprise from about 10% to about 90% by weight of an alkylene carbonate, from about 0.1% to about 20% by weight of hydrogen peroxide, from about 0.1% to about 30% by weight of water, from about 10% to about 90% by weight of a first and second alcohol, and optionally, from about 0% to about 25% by weight of pine oil. Preferably, the composition of the present invention comprises from about 20% to about 70% by weight of an alkylene carbonate, from about 0.5% to about 15% by weight of hydrogen peroxide, from about 0.5% to about 30% by weight of water, from about 20% to about 70% by weight of a first and second alcohol, and, optionally, from about 0% to about 20% by weight of pine oil.

The alkylene carbonate used in the present invention may comprise an alkylene carbonate with from about two to about eight carbon atoms. Preferably, the alkylene carbonate comprises ethylene carbonate or propylene carbonate. More preferably, the alkylene carbonate comprises propylene carbonate.

The hydrogen peroxide and water used in the present invention may be obtained from a variety of commercial sources as an aqueous hydrogen peroxide solution. Such solutions are commonly available with concentrations ranging from about one to about eighty percent. In the present invention, the aqueous hydrogen peroxide solution should have a concentration from about twenty-five percent to about fifty percent, and preferably, a concentration of about thirty-five percent.

The compositions of the present invention may be prepared using JEFFSTRIP™ FST (commercially available from the Huntsman Corporation, Houston, Tex.) as the source of the alkylene carbonate, water, and hydrogen peroxide. JEFFSTRIP™ FST is an alkylene carbonate/water/hydrogen peroxide-based composition. Representative, although not exhaustive, JEFFSTRIP™ FST compositions are disclosed in U.S. Pat. No. 6,040,284, which is incorporated by reference. If JEFFSTRIP™ FST is used in the compositions of the present invention, the compositions may comprise from about 20% to about 70% by weight of JEFFSTRIP™ FST, from about 20% to about 70% by weight of an alcohol, and, optionally, from about 0% to about 25% by weight of pine oil. Preferably, if JEFFSTRIP™ FST is used, the compositions comprise from about 30% to about 50% by weight of JEFFSTRIP™ FST, from about 30% to about 60% by weight of an alcohol, and, optionally, from about 0% to about 20% by weight of pine oil.

The first alcohol may comprise any number of alcohols, including, but not limited to, ethanol, methanol, propanol, butanol, and benzyl alcohol. Preferably, the first alcohol comprises benzyl alcohol. The second alcohol may comprise any number of alcohols, including, but not limited to, ethanol, methanol, propanol, butanol, and benzyl alcohol. Preferably, the second alcohol comprises ethanol, particularly if the composition is to be used as a varnish remover.

Surprisingly, the addition of ethanol or ethanol and pine oil to alkylene carbonate-based compositions (comprising an alkylene carbonate, a hydrogen peroxide solution, and a first alcohol) improves the blistering time of such compositions. Prior to the addition of ethanol or ethanol and pine oil, the alkylene carbonate-based compositions show blistering times of at least about 20 minutes, while subsequent to the addition of ethanol or ethanol and pine oil, the blistering times are reduced to as low as about 11 minutes. Such reduced blistering times are comparable to the blistering times of more toxic methylene chloride-based compositions, which typically have a blistering time from about 5 minutes to about 10 minutes.

The coating remover compositions of the present invention may optionally contain one or more additives. Such additives may comprise thickeners, corrosion inhibitor, chelating agents, stabilizers, surfactants, and organic co-solvents. The addition of an additive(s) may not be necessary in all situations, and is primarily dependent upon the particular application of the coating remover.

For example, a thickener may be mixed with the base composition prior to use to help retain the coating remover composition on the coated surface. The inclusion of a thickener may be necessary if the coating remover is applied to a vertical surface. A suitable thickener should not adversely react with any of the components of the base composition. Suitable thickeners may include, but are not limited to, cellulose ethers, such as hydroxypropyl cellulose, ethyl cellulose, ethyl hydroxyethyl cellulose, methyl cellulose, and other alkyl or hydroxyl cellulose; silica, including colloidal silica; clays, such as bentonite and montmorillonite; alumina, including colloidal alumina; gum arabic; tragacanth; agar; sugar derivative; high molecular weight polyethylene oxides; polyvinyl pyrrolidone; and methyl vinyl ether/maleic anhydride copolymers. Generally, if a thickener is used, it should comprise from about 1 to about 4 percent by weight of the remover composition.

In addition, if the coating remover composition is to be applied to a metal surface, it may be necessary to add a corrosion inhibitor to the coating remover composition. Such corrosion inhibitors may comprise, but are not limited to, ethoxylated butynediol, petroleum sulfonates, blends of propargyl alcohol and thiourea. If used, the corrosion inhibitor typically comprises up to about 10 percent by weight of the total composition.

Further, a chelating agent may also be added to the coating remover composition to prevent or reduce the degradation of the peroxide in the remover composition. Suitable chelating agents include, but are not limited to, ethylene diamine tetraacetic acid (EDTA) and its metal salts, diethylene triamine pentaacetic acid, polyphosphates, diketone, hydroxy carboxylic acids, and phosphonic acids. When used, the chelating agent typically comprises up to about 10 percent by weight of the total composition.

Likewise, a hydrogen peroxide stabilizer may also be added to the coating remover. Such stabilizers may include, but are not limited to, $C_{1-4}$ alkyl anilines, aromatic sulfonic acids, sulfamic acids, sulfones, sulfoxides, sulfolenes, sulfolanes, amino aryl sulfonic acid, benzene disulfonic acid, p-tolyl sulfonic acid, sulfanilic acid, propylene glycol, glycolic acid, glycerine, propionic acid, benzoic acid, cis-4-butenediol, and mixtures thereof. If used, the stabilizer should comprise up to about 10 percent by weight of the total composition, and preferably, up to about 1 percent by weight of the total composition.

Additionally, a surfactant may be added to the coating removal composition to increase the wetting properties of the remover. Such surfactants may include, but are not limited to, non-ionic, anionic, cationic, and amphoteric surfactants, such as monocarboxyl cocoimidazoline, higher alkyl sulfate sodium salts, tridecyloxy poly(alkyleneoxy ethanol), ethoxylated or propoxylated alkyl phenols, alkyl sulfonamides, $C_{10-18}$ alkaryl sulfonates, such as alkylbenzene sulfonates, cocoamphaodipropionate, cetylpalmitic alkanol amides, hydrogenated castor oil, isooctylphenyl polyethoxy ethanol, sorbitan monopalmitate, $C_{8-18}$ alkyl pyrrolidone, cocoaminopropionic acid, and polyethoxy amino salts thereof. If used, the surfactant should comprise from about 0.1 to about 10 percent by weight of the total composition.

Further, an organic co-solvent may also be added to the coating remover compositions. Such co-solvents may include, but are not limited to, hydrocarbons, glycols, glycol ethers, glycol ether esters, esters, ethers, phenols, glycols, sulfur-based solvents, chlorinated hydrocarbons, aromatic hydrocarbons, nitrated hydrocarbons, amides, and ketones. Such co-solvents may be polar or non-polar, protic or aprotic, cyclic, branched, or straight chained, and may contain one or more functional groups. Representative examples of common hydrocarbon solvents include hexane, toluene, xylene, and mixtures of aliphatic and aromatic hydrocarbons. Representative examples of common ether solvents include dibutyl ether, ethyl ether, and diphenyl ether. Representative examples of common ester solvents and lactones include butyrolactone, ethyl actetate, butyl acetate, and DBE (DuPont's dibasic ester mixture). Representative examples of common glycol solvents include ethylene, propylene, butylene glycols, and methyl propane diol. Representative examples of common sulfur-based solvents include dimethylsulfoxide (DMSO) and sulfolane. Representative examples of common chlorinated hydrocarbon solvents include methyl chloride, methyl chloroform, chlorobenzenes and dichlorobenzenes. Representative examples of common nitrated hydrocarbons solvents include nitroethane and nitropropane. Representative examples of common amide solvents include formamide, dimethyl formamide, acetamide, and dimethylacetamide. Representative examples of common ketone solvents include acetone, methyl ethyl ketone (MEK), methyl isobutyl ketone, and methyl isoamylketone.

The coating removal compositions of the present invention may be used to remove a variety of coatings from a variety of surfaces. Such coatings may include, but are not limited to, photoresists, paints, varnishes, or other architectural coatings. Such surfaces may include, but are not limited to, wood, metals, silicon wafers, or wire boards. The coating remover compositions of the present invention are particularly suited for removing varnishes.

In another embodiment, the present invention provides for a method of removing a coating from a surface. The method involves applying a composition comprising an alkylene carbonate, hydrogen peroxide, water, a first alcohol, a second alcohol, and, optionally, pine oil to a coated surface, and allowing the composition to stand on the coated surface for a period of time, and under conditions effective to cause blistering of the coating. Preferably, the method is conducted at ambient pressure and temperature.

The method of the present invention may be used to remove a variety of coatings from a variety of surfaces. Such coatings may include, but are not limited to, photoresists, paints, varnishes, or other architectural coatings. Such surfaces may include, but are not limited to, wood, metals, silicon wafers, or wire boards. The method of the present invention is particularly suited for removing varnishes.

According to the method of the present invention, the coating remover composition may be applied to the coated surface using any suitable method, such as dipping, spraying, or brushing the composition onto the surface. A sufficient amount of the coating remover composition should be applied to the surface to effectuate removal of the coating. Preferably, the coating removal composition should be applied to the surface of the coated object in a thickness adequate to wet the entire coated surface. In some situations, the coating remover composition may need to be applied to the coated surface more than one time to fully remove the coating from the surface.

After application of the coating remover composition, and after the composition has had time to act, the separated coating may be removed from the surface by any means that effectuates removal of the coating. Removal of the separated coating may be accomplished using a rag, scraper, sandblaster, water sprayer, or the like.

A variety of factors may influence the amount of time it takes the coating remover to act (i.e. for the coating to blister). Such factors may include temperature, coating type, coating thickness, etc. In general, it may take between about one minute to about one hour for the coating remover to act, although longer activation times may be observed, depending on the conditions.

The following examples are illustrative of the present invention, and are not intended to limit the scope of the invention in any way.

EXAMPLE 1

The following remover composition samples were mixed in the following proportions (weight percent):

TABLE 1

| Sample | FST[1] | BA[2] | EEP[3] | EtOH[4] | N-60[5] | Terpinol | TBA[6] | Pine Oil |
|---|---|---|---|---|---|---|---|---|
| 1  | 40 | 50 |    |    |    | 10 |    |    |
| 2  | 40 | 40 |    |    | 10 | 20 |    |    |
| 3  | 40 | 40 | 10 |    | 10 | 10 |    |    |
| 4  | 40 | 40 |    | 10 |    | 10 |    |    |
| 5  | 40 | 50 |    |    |    |    | 10 |    |
| 6  | 40 | 40 |    |    |    |    | 20 |    |
| 7  | 40 | 40 | 10 |    |    |    | 10 |    |
| 8  | 40 | 40 |    | 10 |    |    | 10 |    |
| 9  | 40 | 40 |    | 10 |    |    |    | 10 |
| 10 | 40 | 40 |    | 20 |    |    |    |    |
| 11 | 40 | 30 |    | 20 |    |    |    | 10 |
| 12 | 40 | 30 |    | 10 |    |    |    | 20 |
| 13 | 50 | 50 |    |    |    |    |    |    |

[1] The JEFFSTRIP ™ FST composition used in this Example comprised a mixture of 70 grams of propylene carbonate (JEFFSOL ® PC) and 30 grams of a 35% solution of hydrogen peroxide.
[2] Benzyl alcohol.
[3] 3-ethoxyethyl propionate.
[4] Ethanol
[5] SURFONIC ® N-60, commercially available from the Huntsman Corporation, Houston, Texas.
[6] Tertiary butyl alcohol.

Each sample listed in Table 1 was then applied to gym floor boards that were coated with varying amounts of Hillyard Contender®, a floor varnish. The samples were allowed to stand on the boards for a period of time, and the blistering of the coating on the boards was observed by visual inspection. Table 2 summarizes the blistering time for each sample:

TABLE 2

| | Blister Time (minutes) | | |
|---|---|---|---|
| Sample | 1 coat | 2 coats | 3 coats |
| 1  | >240  |       |       |
| 2  | >240  |       |       |
| 3  | >240  |       |       |
| 4  | 38.11 |       |       |
| 5  | 26.01 |       |       |
| 6  | 26.32 |       |       |
| 7  | 22.58 |       |       |
| 8  | 21.59 |       |       |
| 9  | 14.04 | 14.43 | 15.37 |
| 10 | 11.02 | 13.31 | 13.01 |
| 11 | 15.27 | 14.13 | 13.41 |
| 12 | 14.18 | 15.17 | 13.33 |
| 13 | 26.37 | 19.43 | 21.14 |

Table 2 shows that the addition of ethanol, or ethanol and pine oil, to a base composition (comprising an alkylene carbonate, a hydrogen peroxide solution, and benzyl alcohol) (i.e. Samples 8–12) significantly increases the rate of blistering, as compared to base compositions that are not mixed solely with ethanol, or ethanol and pine oil (i.e. Samples 1–7, and 13).

Although illustrative embodiments have been shown and described, a wide range of modification, changes, and substitution is contemplated in the foregoing disclosure. In some instances, some features of the disclosed embodiments may be employed without a corresponding use of the other features. Accordingly, it is appropriate that the appended claims be construed broadly and in a manner consistent with the scope of the invention.

What is claimed is:

1. A composition useful as a coating remover that comprises an alkylene carbonate with from about two to about eight carbon atoms, hydrogen peroxide, water, benzyl alcohol, a second alcohol, and, optionally, pine oil.

2. The composition of claim 1, wherein the second alcohol comprises ethanol.

3. The composition of claim 1, wherein the composition comprises from about 10 percent to about 90 percent by weight of the alkylene carbonate.

4. The composition of claim 1, further comprising an additive selected from the group consisting of thickeners, corrosion inhibitors, chelating agents, stabilizers, surfactants, organic co-solvents, or mixtures thereof.

5. The composition of claim 1, wherein the alkylene carbonate comprises propylene carbonate.

6. The composition of claim 5, wherein the composition comprises at least about 20 percent by weight of propylene carbonate.

7. The composition of claim 2, wherein the coating comprises a varnish.

8. A composition useful as a varnish remover that comprises an alkylene carbonate with from about two to about eight carbon atoms, hydrogen peroxide, water, benzyl alcohol, a second alcohol selected from the group consisting of ethanol, methanol, propanol, and butanol and, optionally, pine oil.

9. The composition of claim 8, wherein the second alcohol comprises ethanol.

10. The composition of claim 8, wherein the alkylene carbonate comprises propylene carbonate.

11. The composition of claim 10, wherein the composition comprises at least about 20 percent by weight of propylene carbonate.

12. The composition of claim 8, further comprising an additive selected from the group consisting of thickeners, corrosion inhibitors, chelating agents, stabilizers, surfactants, organic co-solvents, or mixtures thereof.

13. A composition useful as a coating remover that comprises propylene carbonate, hydrogen peroxide, water, benzyl alcohol, a second alcohol, selected from the group consisting of ethanol, methanol, propanol, and butanol and, optionally, pine oil, wherein the composition comprises at least about 20 percent by weight of propylene carbonate.

14. The composition of claim 13, further comprising an additive selected from the group consisting of thickeners, corrosion inhibitors, chelating agents, stabilizers, surfactants, organic co-solvents, or mixtures thereof.

15. A composition useful as a varnish remover that comprises propylene carbonate, hydrogen peroxide, water, benzyl alcohol, a second alcohol, selected from the group consisting of ethanol, methanol, propanol, and butanol and, optionally, pine oil, wherein the composition comprises at least about 20 percent by weight of propylene carbonate.

16. The composition of claim 13, wherein the second alcohol comprises ethanol.

17. The composition of claim 15, further comprising an additive selected from the group consisting of thickeners, corrosion inhibitors, chelating agents, stabilizers, surfactants, organic co-solvents, or mixtures thereof.

18. A method for removing a coating from a surface comprising the steps of:
   a. contacting the surface with an effective amount of a composition that comprises an alkylene carbonate with from about two to about eight carbon atoms, hydrogen peroxide, water, benzyl alcohol, a second alcohol selecting from the group consisting of ethanol, methanol, propanol, and butanol, and, optionally, pine oil; and b. allowing the composition to contact the surface for a period of time and under conditions effective to cause blistering of the coating.

19. The method of claim 18, wherein the alkylene carbonate comprises propylene carbonate.

20. The method of claim 19, wherein the composition comprises at least about 20 percent by weight of propylene carbonate.

21. The method of claim 18, wherein the composition further comprises an additive selected from the group consisting of thickeners, corrosion inhibitors, chelating agents, stabilizers, surfactants, organic co-solvents, or mixtures thereof.

22. A method for removing varnish from a surface comprising the steps of:
   a. contacting the surface with an effective amount of a composition that comprises an alkylene carbonate with from about two to about eight carbons atoms, hydrogen peroxide, water, benzyl alcohol, a second alcohol, selected from the group consisting of ethanol, methanol, propanol, and butanol and, optionally, pine oil; and
   b. allowing the composition to contact the surface for a period of time and under conditions effective to cause blistering of the varnish.

23. The method of claim 22, wherein the second alcohol comprises ethanol.

24. The method of claim 22, wherein the alkylene carbonate comprises propylene carbonate.

25. The method of claim 24, wherein the composition comprises at least about 20 percent by weight of propylene carbonate.

26. The method of claim 22, wherein the composition further comprises an additive selected from the group consisting of thickeners, corrosion inhibitors, chelating agents, stabilizers, surfactants, organic co-solvents, or mixtures thereof.

27. A method for removing varnish from a surface comprising the steps of:
   a. contacting the surface with an effective amount of a composition that comprises propylene carbonate, hydrogen peroxide, water, benzyl, a second alcohol, selected from the group consisting of ethanol, methanol, propanol, and butanol and, optionally, pine oil, wherein the composition comprises at least about 20 percent by weight of propylene carbonate; and
   b. allowing the composition to contact the surface for a period of time and under conditions effective to cause blistering of the varnish.

28. The method of claim 27, wherein the second alcohol comprises ethanol.

29. The method of claim 27, wherein the composition further comprises an additive selected from the group consisting of thickeners, corrosion inhibitors, chelating agents, stabilizers, surfactants, organic co-solvents, or mixtures thereof.

* * * * *